(12) United States Patent
Millar et al.

(10) Patent No.: US 11,262,184 B1
(45) Date of Patent: Mar. 1, 2022

(54) OPTICAL COHERENCE TOMOGRAPHY (OCT) SYSTEM FOR PRODUCING PROFILOMETRY MEASUREMENTS OF A SPECIMEN

(71) Applicant: Mitsubishi Electric Research Laboratories, Inc., Cambridge, MA (US)

(72) Inventors: David Millar, Concord, MA (US); Celalettin Yurdakul, Boston, MA (US); Pu Wang, Cambridge, MA (US); Kieran Parsons, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 17/082,307

(22) Filed: Oct. 28, 2020

(51) Int. Cl.
*G01B 9/02* (2006.01)
*G01B 9/02091* (2022.01)
*G01B 9/02001* (2022.01)

(52) U.S. Cl.
CPC ..... *G01B 9/02091* (2013.01); *G01B 9/02001* (2013.01); *G01B 9/02034* (2013.01); *G01B 9/02035* (2013.01); *G01B 9/02037* (2013.01); *G01B 9/02044* (2013.01)

(58) Field of Classification Search
CPC ............ G01B 9/02091; G01B 9/02001; G01B 9/02035; G01B 9/02034; G01B 9/02044; G01B 9/02037
See application file for complete search history.

(56) References Cited

U.S. PATENT DOCUMENTS

| 10,024,650 B2* | 7/2018 | Arieli ................... G01J 3/0208 |
| 10,704,889 B2 | 7/2020 | Trenholm et al. |
| 2008/0062429 A1 | 3/2008 | Liang et al. |
| 2014/0028974 A1* | 1/2014 | Tumlinson ......... G01B 9/02043 351/206 |
| 2019/0113328 A1 | 4/2019 | Shen et al. |

(Continued)

OTHER PUBLICATIONS

Kumar et al., "High resolution line scan interferometer for solder ball inspection using a visible supercontinuum source", Oct. 11, 2010, Optics Express, vol. 18, No. 21, p. 22471-22484 (Year: 2010).*

(Continued)

*Primary Examiner* — Jonathan M Hansen
(74) *Attorney, Agent, or Firm* — Gennadiy Vinokur; Hironuri Tsukamoto

(57) ABSTRACT

An optical coherence tomography (OCT) system for profilometry measurements of a specimen with a lateral resolution across the profilometry measurements is provided. The OCT system includes a line-field generator, an interferometer, and a spectrometer. The line-field generator includes a filter arranged in a focal plane of a lens for spatially filtering extended line-field light into a line-field light of a width equal to the lateral resolution. The interferometer is configured to interfere the line-field light reflected from the specimen illuminated with a line-shaped focus with a reference signal of the line-field light to produce an interference pattern. The spectrometer configured to analyze spectral components of the interference pattern in a digital domain to produce the profilometry measurements of the specimen.

15 Claims, 13 Drawing Sheets

(56) References Cited

U.S. PATENT DOCUMENTS

2020/0201058 A1    6/2020   Ginner et al.

OTHER PUBLICATIONS

Endo et al. "Profilometry with line-field fourier domain interferometry." OCIS codes: (180.6900) Three-dimensional microscopy; (120.2650) Fringe analysis. Feb. 7, 2005 / vol. 13, No. 3 / Optics Express. Optical Society of America. https://optics.bk.tsukuba.ac.jp/COG/COGWiki/.

Suliali et al. "Development of a Free Space, LED Illuminated Spectral-domain Optical Coherence Tomography Setup." Universal Journal of Physics and Application 11(5): 176-181, 2017.

One et al. "Linefield Coherent Sensing with LED Illumination." 2020 Optical Society of America under the terms of the OSA Open Access Publishing Agreement.

* cited by examiner

OPTICAL COHERENCE TOMOGRAPHY (OCT) SYSTEM FOR PRODUCING PROFILOMETRY MEASUREMENTS OF A SPECIMEN

TECHNICAL FIELD

The present disclosure relates generally to imaging and more particularly to an optical coherence tomography (OCT) system for producing profilometry measurements of a specimen.

BACKGROUND

In many applications, electromagnetic sensing can be used to obtain information about surface or subsurface of a particular specimen. One such technique is tomography. Tomography can be used for various applications, for example, radiology, biology, materials science, manufacturing, quality assurance, quality control, or the like. Some types of tomography include, for example, optical coherence tomography (OCT), x-ray tomography, positron emission tomography, optical projection tomography, or the like.

OCT is an interferometric imaging technique that coherently detects an optical signal from the target with a reference signal. OCT offers non-invasive, noncontact label-free imaging of the specimen with micron scale resolution in three dimensions. Due to ability of OCT to achieve micron scale resolution, it is used across several medical specialties including ophthalmology and cardiology. The majority of OCT studies are conducted in near-infrared wavelength regime. However, the near-infrared wavelength regime requires expensive light sources such as super luminescent diodes and swept-source lasers. On the other hand, visible-light optical coherence tomography (vis-OCT) can provide superior lateral resolution while maintaining high axial resolution with a narrower bandwidth requirement compared with the near-infrared wavelength regime. The use of narrow band light sources reduces chromatic dispersion. Also, scattering cross-section in vis-OCT is larger compared with longer wavelengths due to an inverse relation with fourth power of illumination wavelength. However, vis-OCT relies on expensive supercontinuum lasers as well as line-scan cameras.

SUMMARY

It is objective of some embodiments to provide an economical OCT system for producing profilometry measurements of a specimen. Some embodiments aim to provide an economical OCT system by replacing expensive light sources, like lasers, with economical light sources, like light-emitting diode (LED). Additionally, it is an objective of some embodiments to provide an OCT system that can use an economical light source without compromising the desired resolution of the profilometry measurements.

The OCT system is used to produce the profilometry measurements of the specimen. The profilometry measurements may correspond to topographical measurements or a topographic map of surface of the specimen. Some embodiments are based on recognition that the OCT system requires expensive components (e.g. super-luminescent diode (SLD), swept-frequency laser); laser confocal microscopy, which requires scanning of the specimen in three dimensions, and expensive mechanical components; and white light interferometry, which requires expensive optical components, and detailed calibration.

Some embodiments aim to provide an economical OCT system by replacing expensive light sources, like lasers, with economical light sources, like light-emitting diodes (LEDs), for producing the profilometry measurements with micron precision. Some embodiments are based on recognition that such an aim can be achieved if light from the LED can be transformed into a narrow line-field light of micron width suitable for profilometry of the specimen. However, such a transformation is challenging because of properties of the LED, such as low intensity, omnidirectional radiation, and the like. Due to such properties of the LED, the LED light sources have problems generating extremely narrow line-field light with sufficient optical power. For example, due to the omnidirectional radiation property of the LED, it is difficult to direct efficiently the LED light into a pinhole or cylindrical lens. Further, due to a chip image of the LED, under magnification, a target image is convolved with the chip image of the LED.

Further, the LED is an extended light source. In context of the OCT for high-resolution profilometry measurements, a complex relationship exists between types of the light sources and quality of the profilometry measurements. Specifically, the light source should have sufficient power and angular size to generate light with sufficient brightness and spatial resolution to be viewed as a point source with respect to a desired resolution of the profilometry measurements of the specimen. However, the light sources satisfying these requirements, such as supercontinuum lasers and super luminescent diodes (SLD), are expensive.

To that end, some embodiments are based on objective of providing an OCT system that can use an economical light source without compromising the desired resolution of the profilometry measurements. Some embodiments are based on realization that extended light sources (such as LEDs) are economical but cannot be viewed as the point sources for high-resolution profilometry measurements on a scale of micrometers or nanometers because size of the extended sources are in a range of millimeters. In addition, the economical light sources are less powerful. In particular, the extended light sources may be powerful enough to be used in the profilometry measurements with resolution governed by their size, but not powerful enough to be converted into the point sources, e.g., using a pinhole or cylindrical lens, due to significant power loss during such a conversion. To that end, transformation of the light emitted by the LED into a point source light, e.g., by passing the LED light through the pinhole before a cylindrical lens will degrade power of the light emitted by the LED even further making the LED unsuitable for the profilometry measurements of the specimen.

However, some embodiments are based on a realization that instead of transforming the light emitted by the LED into the point light source, the light emitted by the LED can be transformed into a linear light source. In other words, the LED light is shaped not to the point, but to the line. The linear light source and/or light emitted by the linear light source placed in focus of the cylindrical lens can still be transformed into the line-field light. In addition, the transformation of the light emitted by the LED into the linear light source will not block as much power as for the point light source. Some embodiments are based on realization that such a linear transformation preserves a sufficient amount of power suitable for the profilometry measurements of the specimen.

Further, some embodiments are based on understanding that a light source can be considered as the point source if resolution of the OCT system is too low to resolve the light source's apparent size. Accordingly, whether the light source can be considered as the extended light source or the point light source is determined by a desired resolution of the profilometry measurements. To that end, as used herein, the extended light source is a light source of a size greater than the desired resolution of the profilometry measurements.

To that end, in an embodiment, the OCT system includes the extended light source, i.e., the LED, of an angular size greater than a lateral resolution, for example, in order of micrometre or nanometre. The LED emits light. The emitted light is directed to a lens arranged on a path of the light emitted by the LED. According to an embodiment, the lens may correspond to the cylindrical lens. The lens transforms the emitted light into an extended light-field light. However, width of the extended light-field light from the lens may be broad (for example, in mm scale). In other words, the width of the extended light-field light from the lens is greater than the lateral resolution.

Some embodiments are based on realization that a filter can be used with the lens to reduce the width of the extended light-field light and filter extended light-field light into the line field light. The filter includes a slit. The filter including the slit is arranged in a focal plane of the lens for spatially filtering the extended line-field light into the line-field light of a desired width. A width of the slit is on the scale of the lateral resolution. For example, the width of the slit is in order of micrometre or nanometre. As a result, the filter selects a spatially small width from a broader width and reduces the width of the line-field light from millimetre range into micrometre or nanometre range. Specifically, in some implementations, the width of the slit is equal to the lateral resolution. To that end, the filter spatially filters the extended light-field into the line-field light of a desired width. The transformation of the LED light into the line-field light (a line illumination) via the filter allows exposure time to be significantly reduced when imaging, which may result in one or more of quicker B-scan speeds, reduced distortion, and fewer image artefacts. Motion artefacts in particular can be reduced using the line-field light.

The combination of the LED, the lens and the filter may be referred to as the line-field generator. To that end, some embodiments replace expensive light sources, like lasers, in the OCT system with the LED combined with the filter at the focal plane of the lens arranged on the path of the light emitted by the LED, such that during operation of the OCT system, the lens transforms the LED light into the extended light-field and passes the extended light-field through the filter to form the line-field light of the desired width. Further, the line-field light powers interferometer and spectrometer arranged for profilometry of the specimen.

In some implementations, size of the extended light source (i.e., the LED) is of millimeter-scale in a range between 0.1 mm and 10 mm, while the lateral resolution is of micrometer-scale in a range between 0.1 µm and 10 µm. In some other implementations, the LED is of millimeter-scale in a range between 0.1 mm and 10 mm, while the lateral resolution is of nanometer-scale in a range between 0.1 nm and 10 nm.

The LED has a particular wavelength and a bandwidth. The bandwidth of the LED defines an axial resolution along a height of the profilometry measurements. The wavelength and the bandwidth are selected such that the selected wavelength and bandwidth lead to the axial resolution of micron scale with a visible spectrum componentry. For example, a partially coherent narrowband green LED that has the wavelength $\lambda=530$ nm with the bandwidth $\Delta\lambda=35$ nm is employed as the light source. Such values of the wavelength and the bandwidth lead to the axial resolution of 1.4 micron. In an embodiment, the LED has optical power of 500 mW. According to some embodiments, the LED with aforementioned values of the wavelength, the bandwidth, and the optical power results into a powerful enough LED suitable for the desired resolution of the profilometry measurements of the specimen. Further, the LED with such specifications is economical, due to which the OCT system transforms into an economical OCT system.

In some implementations, the OCT system includes an interferometer configured to interfere the line-field light reflected from the specimen with a reference signal of the line-field light to produce an interference pattern. The interference pattern includes spectral components and can be used to produce information on characteristics of the specimen. The spectrometer is configured to analyze the spectral components of the interference pattern in a digital domain to produce the profilometry measurements of the specimen.

The spectrometer includes a diffraction grating, a lens, and an area sensor. According to an embodiment, the diffraction grating is arranged between the interferometer and the area sensor, such that spectral components in the interference pattern are diffracted perpendicular to the line-field light. The interference pattern is directed onto the diffraction grating at an angle of incidence. The diffraction grating splits and diffracts the interference pattern into the spectral components present in the interference pattern. Further, the spectral components are directed onto the area sensor via the lens. The lens focuses the spectral components onto the area sensor. In some implementations, the area sensor is a CMOS (complementary metal oxide semiconductor) image sensor. The CMOS image sensor has an increased signal to noise ratio.

To that end, the area sensor captures the interference pattern or the spectral components of the interference pattern. Upon receiving the interference pattern, the area sensor can convert the radiance/intensity of the interference pattern into an electrical signal. In some embodiments, the electrical signal may then be converted to a digital signal, and modified by signal conditioning techniques such as filtering and amplification. In some cases, the interference pattern can be converted into a signal by the area sensor via, for example, a high-speed digitizer.

Some embodiments are based on recognition that Spectral Domain (SD) OCT enables sensitive and high-speed axial scans. Alternatively, in some embodiments, two dimensions of the area sensor are used to measure spectrogram at each point along the x dimension. For example, a parallel SD-OCT is used. Instead of recording A-scans point by point, multiple A-scans along a line are captured using an area scan camera. In the parallel SD-OCT, the specimen is illuminated by the line-field light and the multiple A-scans along the line-field light are recorded simultaneously. To that end, the OCT system includes a motorized XY stage configured to scan the specimen along the lateral direction. Each A-scan along is imaged into a row of the area sensor. This enables a less complex OCT system. Further, according to some embodiments, the interference pattern captured by the area sensor can be transformed into an image in x-z plane using a fast-Fourier transform (FFT). According to an embodiment, such an image may include the profilometry measurements of the specimen.

Accordingly, one embodiment discloses an optical coherence tomography (OCT) system for profilometry measurements of a specimen with a lateral resolution across the profilometry measurements, comprising: a line-field generator including an extended light source of an angular size greater than the lateral resolution, a lens arranged on a path of light emitted by the extended light source for focusing the light into an extended line-field light of a width greater than the lateral resolution, and a filter arranged in a focal plane of the lens for spatially filtering the extended line-field light into a line-field light of a width equal to the lateral resolution; an interferometer configured to interfere the line-field light reflected from the specimen illuminated with a line-shaped focus with a reference signal of the line-field light to produce an interference pattern; and a spectrometer configured to analyze spectral components of the interference pattern in a digital domain to produce the profilometry measurements of the specimen. According to an embodiment, the extended light source includes a light-emitting diode (LED).

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
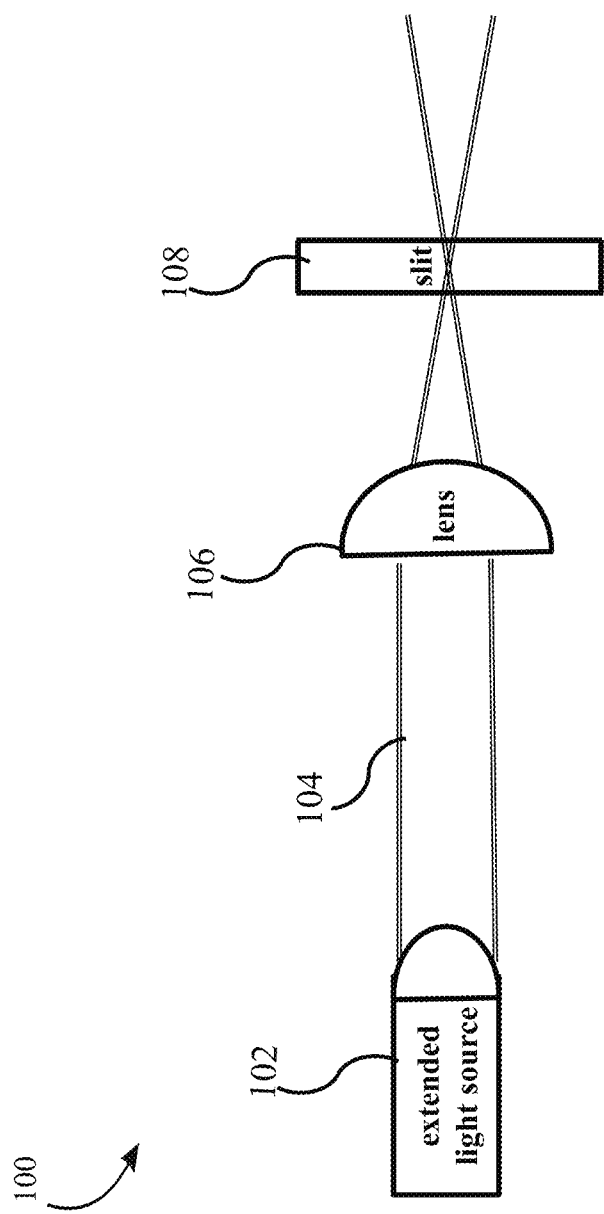
FIG. 1A shows a schematic of a line-field generator of an optical coherence tomography (OCT) system, according to an embodiment.

FIG. 1A shows a schematic of a line-field generator 100 of an optical coherence tomography (OCT) system, according to an embodiment. The OCT system is used to produce profilometry measurements of a specimen. The profilometry measurements may correspond to topographical measurements or a topographic map of surface of the specimen.

Some embodiments are based on recognition that the OCT system requires expensive components (e.g. superluminescent diode (SLD), swept-frequency laser); laser confocal microscopy, which requires scanning of the specimen, and expensive mechanical components; and white light interferometry, which requires expensive optical components, and detailed calibration.

Some embodiments aim to provide an economical OCT system by replacing expensive light sources, like lasers, with economical light sources, like light-emitting diode (LED), for producing the profilometry measurements with micron precision. Some embodiments are based on recognition that such an aim can be achieved if light from the LED can be transformed into a narrow line-field light of micron width suitable for profilometry of the specimen. However, such a transformation is challenging because of properties of the LED, such as low intensity, omnidirectional radiation, and the like. Due to such properties of the LED, LED light sources have problems for generating line-field light. For example, due to the omnidirectional radiation property of the LED, it is difficult to direct efficiently the LED light into a pinhole or cylindrical lens. Further, due to a chip image of the LED, under magnification, a target image is convolved with the chip image of the LED.

Further, the LED is an extended light source. In context of the OCT for high-resolution profilometry measurements, a complex relationship exists between types of the light sources and quality of the profilometry measurements. Specifically, the light source should have sufficient power and angular size to generate light with sufficient brightness and spatial resolution to be viewed as a point source with respect to a desired resolution of the profilometry measurements of the specimen. However, the light sources satisfying these requirements, such as supercontinuum lasers and super luminescent diodes (SLD), are expensive.

To that end, some embodiments are based on objective of providing an OCT system that can use an economical light source without compromising the desired resolution of the profilometry measurements. Some embodiments are based on realization that extended light sources (such as LEDs) are economical but cannot be viewed as the point sources for high-resolution profilometry measurements on a scale of micrometers or nanometers because size of the extended sources is in a range of millimeters. In addition, the economical light sources are less powerful. In particular, the extended light sources may be powerful enough to be used in the profilometry measurements with resolution governed by their size, but not powerful enough to be converted into the point sources, e.g., using a pinhole or cylindrical lens, due to significant power loss during such a conversion. To that end, transformation of the light emitted by the LED into a point source light, e.g., by passing the LED light through the pinhole before a cylindrical lens will degrade power of the light emitted by the LED even further making the LED unsuitable for the profilometry measurements of the specimen.

However, some embodiments are based on a realization that instead of transforming the light emitted by the LED into the point light source, the light emitted by the LED can be transformed into a linear light source. In other words, the LED light is shaped not to the point, but to the line. The linear light source and/or light emitted by the linear light source placed in focus of the cylindrical lens can still be transformed into the line-field light. In addition, the transformation of the light emitted by the LED into the linear light source will not block as much power as for the point light source. Some embodiments are based on realization that such a linear transformation preserves a sufficient amount of power suitable for the profilometry measurements of the specimen.

Further, some embodiments are based on understanding that a light source can be considered as the point source if resolution of the OCT system is too low to resolve the light source's apparent size. Accordingly, whether the light source can be considered as the extended light source or the point light source is determined by a desired resolution of the profilometry measurements. To that end, as used herein, the extended light source is a light source of a size greater than the desired resolution of the profilometry measurements.

To that end, in an embodiment, the OCT system includes the extended light source, i.e., a LED 102 of an angular size greater than a lateral resolution, for example, in order of micrometre or nanometre. The LED 102 emits light 104. The emitted light 104 is directed to a lens 106 arranged on a path of the light emitted by the LED 102. According to an embodiment, the lens 106 may correspond to the cylindrical lens. According to another embodiment, the lens may incorporate a diffusing surface to reduce the effects of chip-image. The lens 106 transforms the emitted light 104 into an extended light-field light. However, width of the extended light-field light from the lens 106 may be broad (for example, in mm scale). In other words, the width of the extended light-field light from the lens 106 is greater than the lateral resolution.

Some embodiments are based on realization that a filter 108 can be used with the lens 106 to reduce the width of the extended light-field light and filter extended light-field light into the line field light.

Figure 1B:
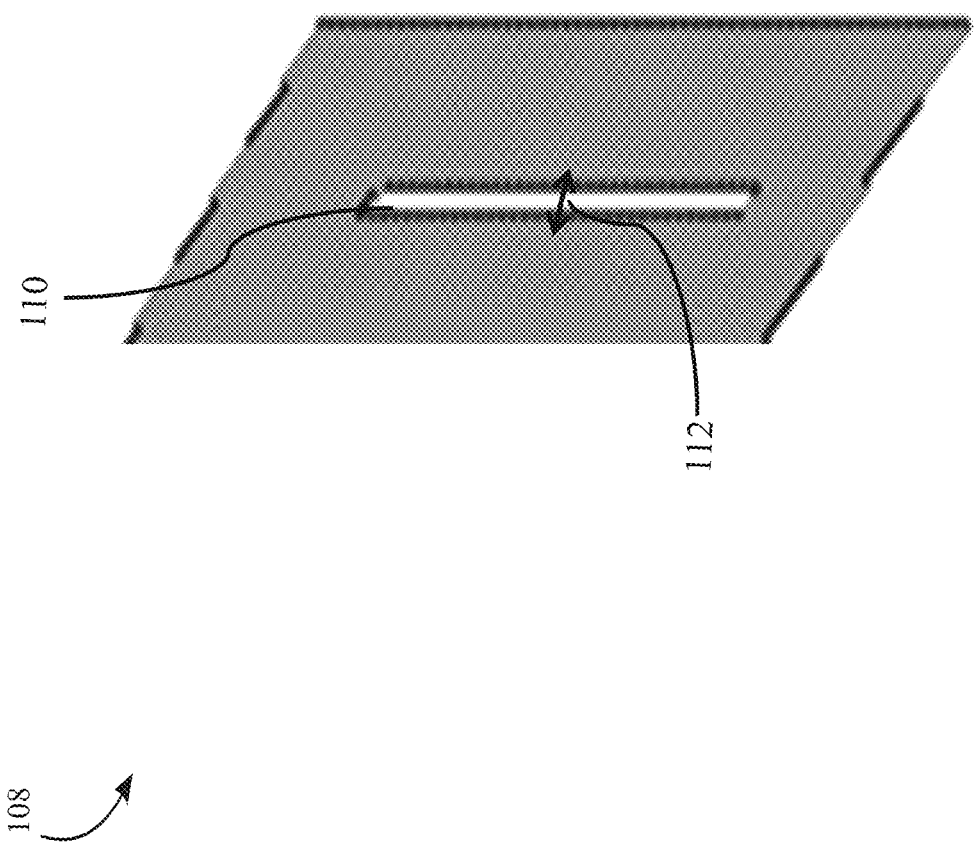
FIG. 1B shows a perspective view of a filter including slit, according to some embodiments.

FIG. 1B shows a perspective view of the filter 108, according to some embodiments. According to some embodiments of the invention, the filter 108 may include a slit 110. The filter 108 including the slit 110 is arranged in a focal plane of the lens 106 for spatially filtering the extended line-field light into the line-field light of a desired width. A width 112 of the slit 110 is on the scale of the lateral resolution. For example, the width 112 of the slit 110 is in order of micrometre or nanometre. As a result, the filter 108 selects a spatially small width from a broader width and reduces the width of the line-field light from millimetre range into micrometre or nanometre range. Specifically, in some implementations, the width 112 of the slit 110 is equal to the lateral resolution. To that end, the filter 108 spatially filters the extended light-field into the line-field light of a desired width.

Figure 1C:
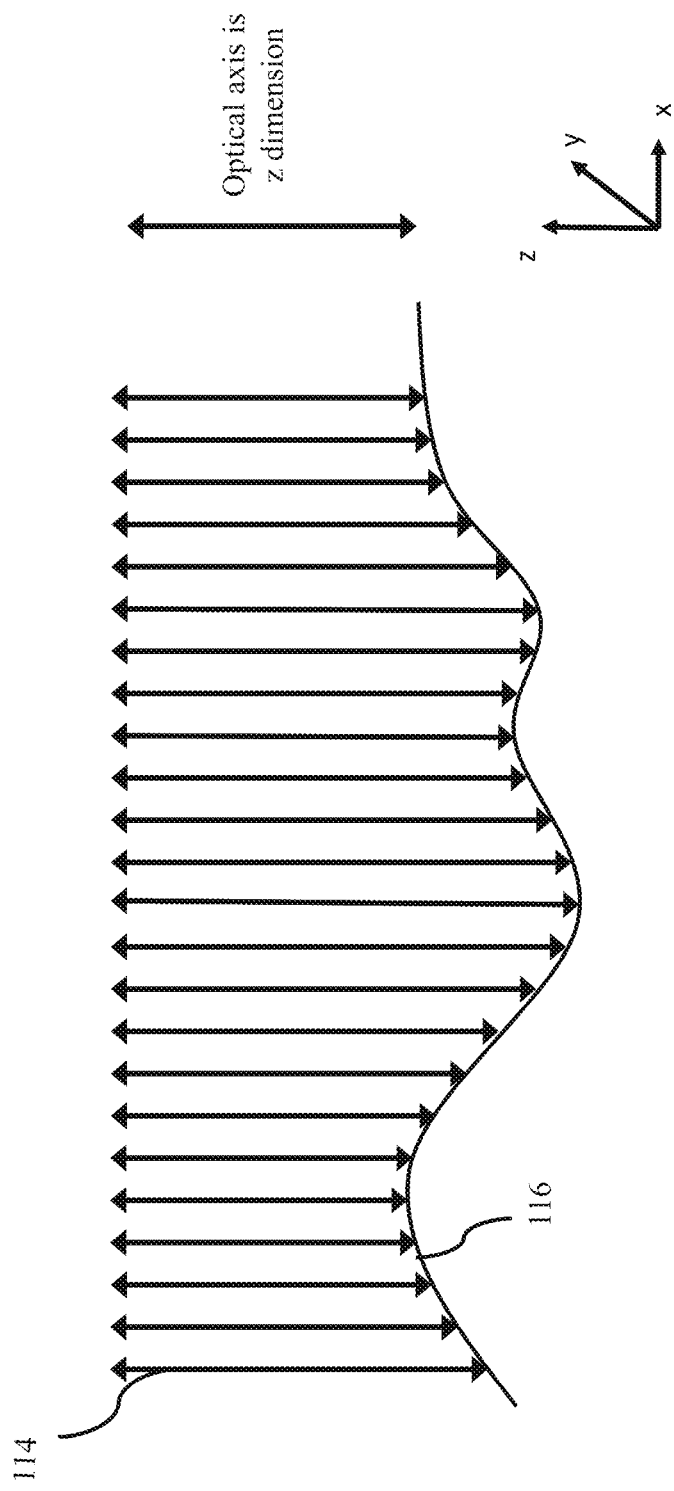
FIG. 1C shows an exemplary line-field light, according to some embodiments.

FIG. 1C shows an exemplary line-field light 114, according to some embodiments. The line-field light 114 has one spatial dimension. The line field light 114 can produce image of the specimen in 1D. For example, the line-field light 114 can produce a target profile 116 in x dimension. Further, according to some embodiments, the line-field light 114 can produce z-axis profile along the x dimension with single-shot area sensor image using coherent techniques. The transformation of the LED light into the line-field light (a line illumination) via the filter 108 allows exposure time to be significantly reduced when imaging, which may result in one or more of quicker B-scan speeds, reduced distortion, and fewer image artefacts. Motion artefacts in particular can be reduced using the line-field light.

The combination of the LED 102, the lens 106 and the filter 108 may be referred to as the line-field generator 100. To that end, some embodiments replace expensive light sources, like lasers, in the OCT system with the LED 102 combined with the filter 108 at the focal plane of the lens 106 arranged on the path of the light emitted by the LED 102, such that during operation of the OCT system, the 106 lens transforms the LED light into the extended light-field and passes the extended light-field through the filter 108 to form the line-field light of the desired width. Further, the line-field light powers interferometer and spectrometer arranged for profilometry of the specimen.

Figure 2A:
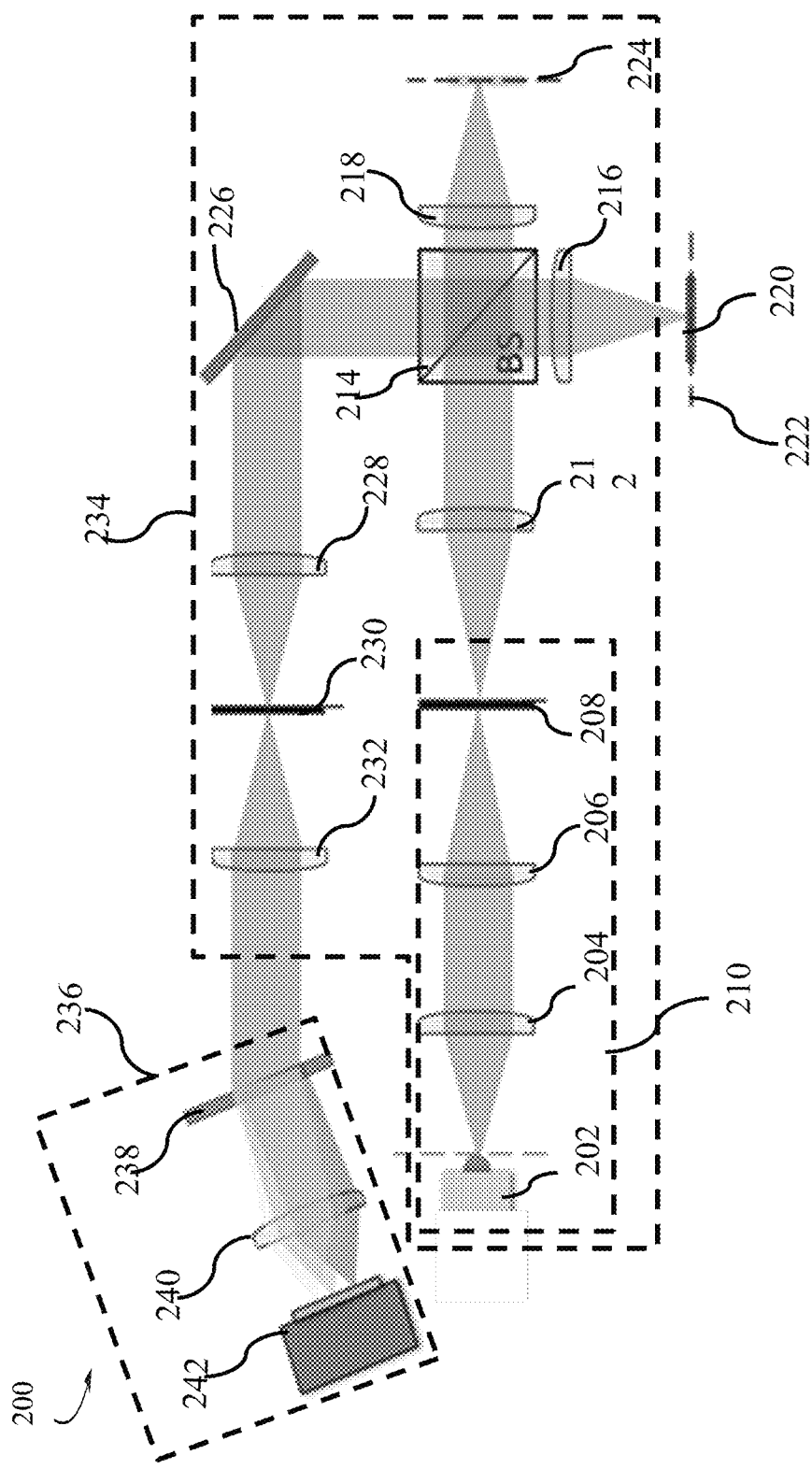
FIG. 2A shows a schematic of the OCT system for producing profilometry measurements of a specimen, according to some embodiments.

FIG. 2A shows a schematic of an OCT system 200 for producing profilometry measurements of a specimen 220, according to some embodiments. The OCT system 200 includes a line-filed generator 210 including a LED 202, a lens 202, a cylindrical lens 206 and a filter 208. The OCT system 200 includes an interferometer 210 and a spectrometer 234. According to an embodiment, the interferometer 234 includes one or more of the LED 202, the lens 202, the cylindrical lens 206, the filter 208, lenses 212, 216, 218, 228, and 232, a beam splitter 214, a mirror 226, and a spatial filter 230. The spectrometer 236 includes a diffraction grating 238, a lens 240, and an area sensor 242. According to some embodiments, the lenses 212, 216, 218, 228, 232, and 240 are identical achromatic doublets. In an embodiment, the interferometer 210 is a Michelson interferometer. In an alternate embodiment, the interferometer 210 is a Linnik interferometer. In some implementations, magnification of optics in one or combination of the interferometer 210 and the spectrometer 234 defines a longitudinal resolution along a length of the profilometry measurements.

The LED 202 is employed as the light source. In some implementations, size of the extended light source (i.e., the LED 202) is of millimeter-scale in a range between 0.1 mm and 10 mm, while the lateral resolution is of micrometer-scale in a range between 0.1 μm and 10 μm. In some other implementations, the LED 202 is of millimeter-scale in a range between 0.1 mm and 10 mm, while the lateral resolution is of nanometer-scale in a range between 0.1 nm and 10 nm.

The LED 202 has a particular wavelength and a bandwidth. The bandwidth of the LED 202 defines an axial resolution along a height of the profilometry measurements. The wavelength and the bandwidth are selected such that the selected wavelength and bandwidth lead to the axial resolution of micron scale with a visible spectrum componentry. For example, a partially coherent narrowband green LED that has the wavelength $\lambda=530$ nm with the bandwidth $\Delta\lambda=35$ nm is employed as the light source. Such values of the wavelength and the bandwidth lead to the axial resolution of 1.4 micron. In an embodiment, the LED 202 has optical power of 500 mW. According to some embodiments, the LED 202 with aforementioned values of the wavelength, the bandwidth, and the optical power results into a powerful enough LED 202 suitable for the desired resolution of the profilometry measurements of the specimen 220. Further, the LED 202 with such specifications is economical, due to which the OCT system 100 transforms into an economical OCT system.

Further, in some embodiments, a coherence length of the LED 202 is $l_c$=7 µm, which can provide approximately 3.5 µm axial resolution. The light from LED 202 is illumination radiation, and passed through a lens 204. The lens 204 collimates the light emitted by the LED 202. The lens 204 is an aspheric condenser with diffused surface and may be referred to as a diffuser. The diffused surface eliminates the LED chip image that creates heterogeneous illumination patterns at a far field. Additionally, in some implementations, an apodization filter is placed after the lens 204 to provide more uniform beam shape which directly affects the line-field light uniformity. According to an embodiment, the lens 204 is configured to collimate the light from the LED 202, such that amount of optical power coupled from the LED 202 onto the filter 208 is maximized. In some implementations, additionally, a collimating lens may be arranged between the LED 202 and the cylindrical lens 206, such that the amount of optical power coupled from the LED 202 onto the filter 208 is maximized.

Further, the collimated light from the lens 204 is passed through the cylindrical lens 206. The cylindrical lens 206 lens asymmetrically focuses the collimated light on a slit of the filter 208. In an alternate embodiment, the filter 208 includes an adjustable slit. In an embodiment, width of the slit is set to 10 µm close to a camera pixel limited resolution. The LED 202, the cylindrical lens 206, and the filter 208 may correspond to the LED 102, the lens 106, and the filter 110, respectively, described above with reference to FIG. 1. The filter 208 spatially filters the light from the cylindrical lens 206 into the line-filed light.

Further, the line-filed light is directed to the beam-splitter 214 to allow the line-filed light to be used for illumination and imaging. The beam-splitter 214 split the line-filed light into two derivative beams (or paths). The first derivative beam can be referred to as a reference signal (or path or arm) and the second derivative beam can be referred to as the sample signal (or path or arm) of the interferometer 234. In an embodiment, the beam splitter 214 is configured to split the line-field light at 50:50 ratio. The pairs of identical achromatic doublets image the line-filed light onto a specimen plane 222 and a reference plane 224 through the beam splitter 214. For example, the lenses 212, 216, and 218 may be identical achromatic lenses, for example, achromatic doublets. The lens 212 and the lens 216 can form a pair of identical achromatic doublets, and the lens 212 and the lens 218 can form another pair of identical achromatic doublets. Such pairs of the identical achromatic doublets image the line-filed light onto the specimen plane 222 and the reference plane 224 through the beam splitter 214.

In some cases, the OCT system 200 may include a scanner head to direct at least a portion of the line-filed light onto the specimen 220. In some cases, the scanner head can include a beam steering device to direct light to the specimen 220. The beam steering device may be, for example, a mirror galvanometer in two dimensions, a single axis scanner, a microelectromechanical system (MEMs)-based scanning mechanism, or other suitable mechanism for beam steering. The beam steering device may be controlled electromechanically.

Further, the OCT system 100 includes the mirror 226 mounted to provide a reference signal of the line-field light for interferometric detection. The line-field light on both the specimen plane 222 and the reference plane 224 are relayed onto a spatial filter 230 using the relay pairs of the lens 216 and the lens 228, and the lens 218 and the lens 228. The relayed line-field light is spatially filtered at the spatial filter 230 including a slit. The width of the slit of the filter 230 is same as the width of the slit of the filter 208. The spatially filtered light at the filter 230 is passed through the lens 232. The lens 232 collimates the spatially filtered light. The interferometer 234 is configured to interfere the line-field light reflected from the specimen 220 with the reference signal of the line-field light to produce an interference pattern. The interference pattern includes spectral components (also referred as frequency components) and can be used to produce information on characteristics of the specimen 220.

The spectrometer 236 is configured to analyze the spectral components of the interference pattern in a digital domain to produce the profilometry measurements of the specimen 220. The collimated spatially filtered light at the lens 232 may correspond to the interference pattern and is directed to the spectrometer 236. The spectrometer 236 includes the diffraction grating 238. According to an embodiment, the diffraction grating 238 is arranged between the interferometer 234 and the area sensor 242, such that spectral components in the interference pattern are diffracted perpendicular to the line-field light. The interference pattern is directed onto the diffraction grating 238 at an angle of incidence. The diffraction grating 238 splits and diffracts the interference pattern into the spectral components present in the interference pattern. Further, the spectral components are directed onto the area sensor 242 via the lens 240. The lens 240 focuses the spectral components onto the area sensor 242. In some implementations, the area sensor 242 is a CMOS (complementary metal oxide semiconductor) image sensor. The CMOS image sensor has an increased signal to noise ratio.

To that end, the area sensor 242 captures the interference pattern or the spectral components of the interference pattern. Upon receiving the interference pattern, the area sensor 242 can convert the radiance/intensity of the interference pattern into an electrical signal. In some embodiments, the electrical signal may then be converted to a digital signal, and modified by signal conditioning techniques such as filtering and amplification. In some cases, the interference pattern can be converted into a signal by the area sensor 242 via, for example, a high-speed digitizer.

Figure 2B:
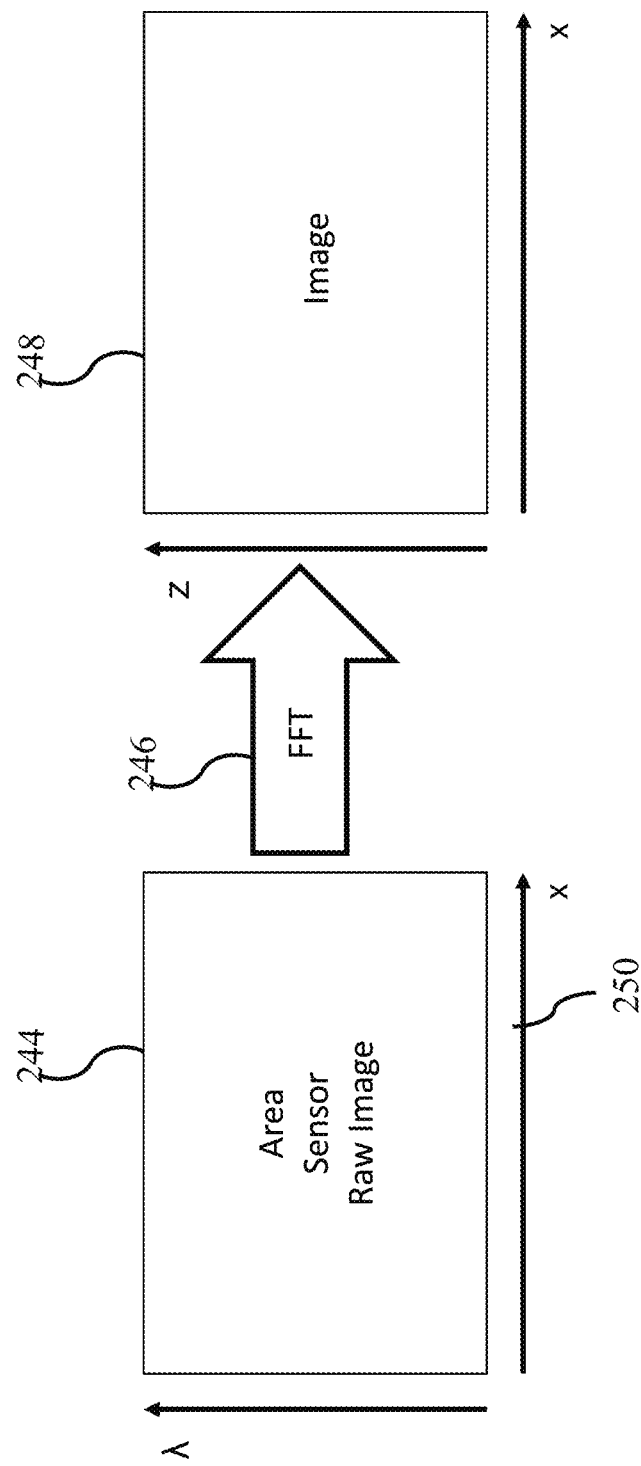
FIG. 2B shows a schematic of spectral imaging with an area sensor, according to some embodiments.

FIG. 2B shows a schematic of spectral imaging with the area sensor 242, according to some embodiments. Some embodiments are based on recognition that Spectral Domain (SD) OCT enables sensitive and high-speed axial scans. Alternatively, in some embodiments, two dimensions of the area sensor 242 are used to measure spectrogram at each point along the x dimension 250. For example, a parallel SD-OCT is used. Instead of recording A-scans point by point, multiple A-scans along a line are captured using an area scan camera. In the parallel SD-OCT, the specimen 220 is illuminated by the line-field light and the multiple A-scans along the line-field light are recorded simultaneously. To that end, the OCT system 200 includes a motorized XY stage configured to scan the specimen 220 along the lateral direction. Each A-scan along is imaged into a row of the area sensor 242. This enables a less complex OCT system 200. A raw image is captured by the area sensor 242, i.e., the inference pattern captured. Fourier transformation is applied on the raw image 244 to produce an image 248 in x-z plane. Specifically, fast-Fourier transform (FFT) is applied on the raw image 244 to produce the image 248 in the x-z plane. According to an embodiment, the image 248 may include the profilometry measurements of the specimen 220.

Figure 3:
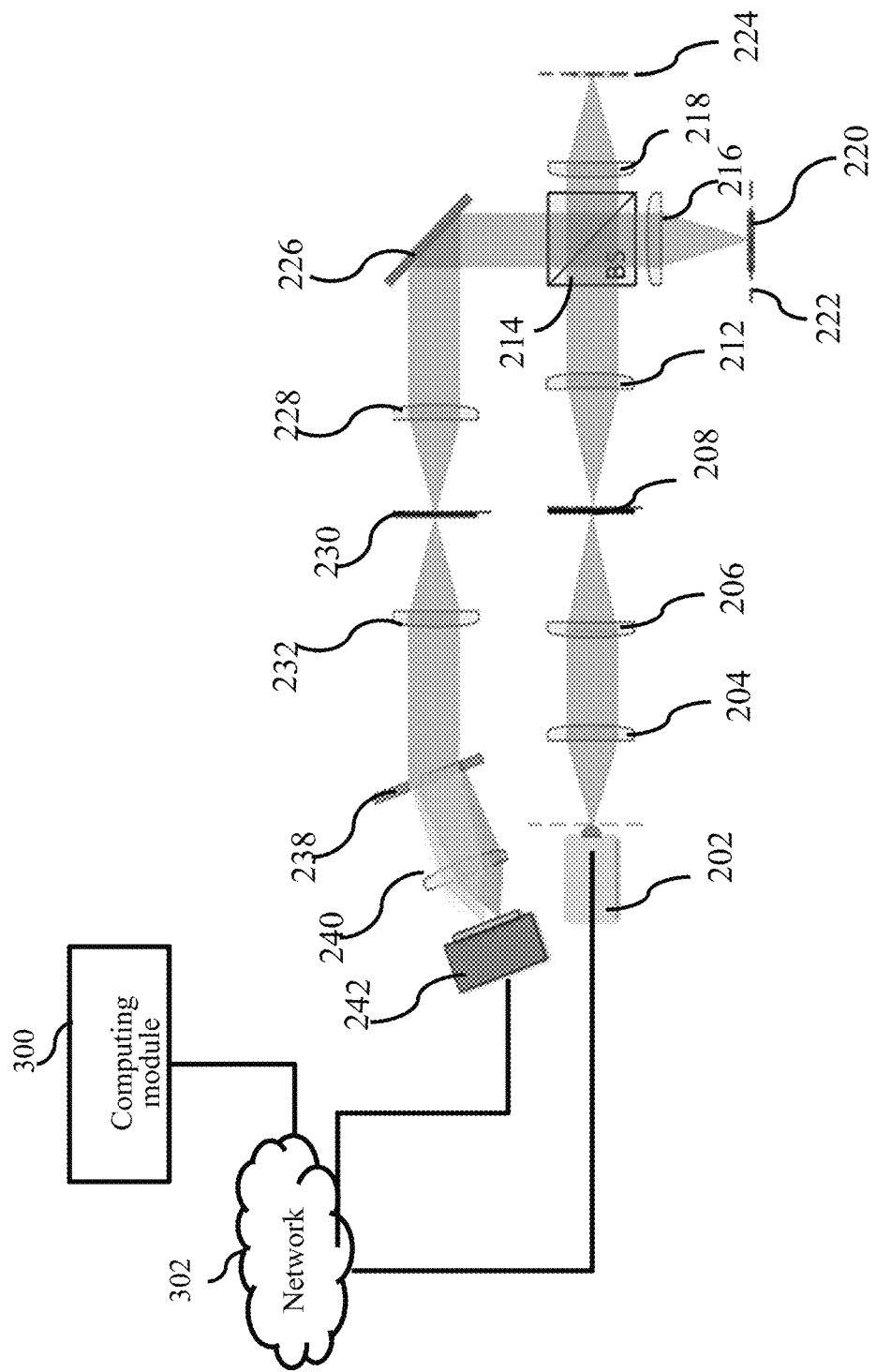
FIG. 3 shows a schematic of the OCT system including a computing module, according to some embodiments.

FIG. 3 shows a schematic of the OCT system 200 including a computing module 300, according to some embodiments. The computing module 300 may be locally communicatively linked or remotely communicatively linked, for example via a network 302, to one or more other elements of the OCT system 200; for example, to the light source 202, and the area sensor 242. The computing module 300 may be used for processing and analysis of imaging data (for e.g., the spectral components of the interference pattern) provided by the OCT system 200. In some cases, the computing module 300 may operate as a control system or controller, and in other cases, may be connected to a separate control system or controller. For example, the computing module 300 may operate the motorized XY stage. Further, the computing module 300 may host a user-accessible platform for invoking services, such as reporting and analysis services, and for providing computational resources to effect machine learning techniques on the imaging data.

Figure 4:
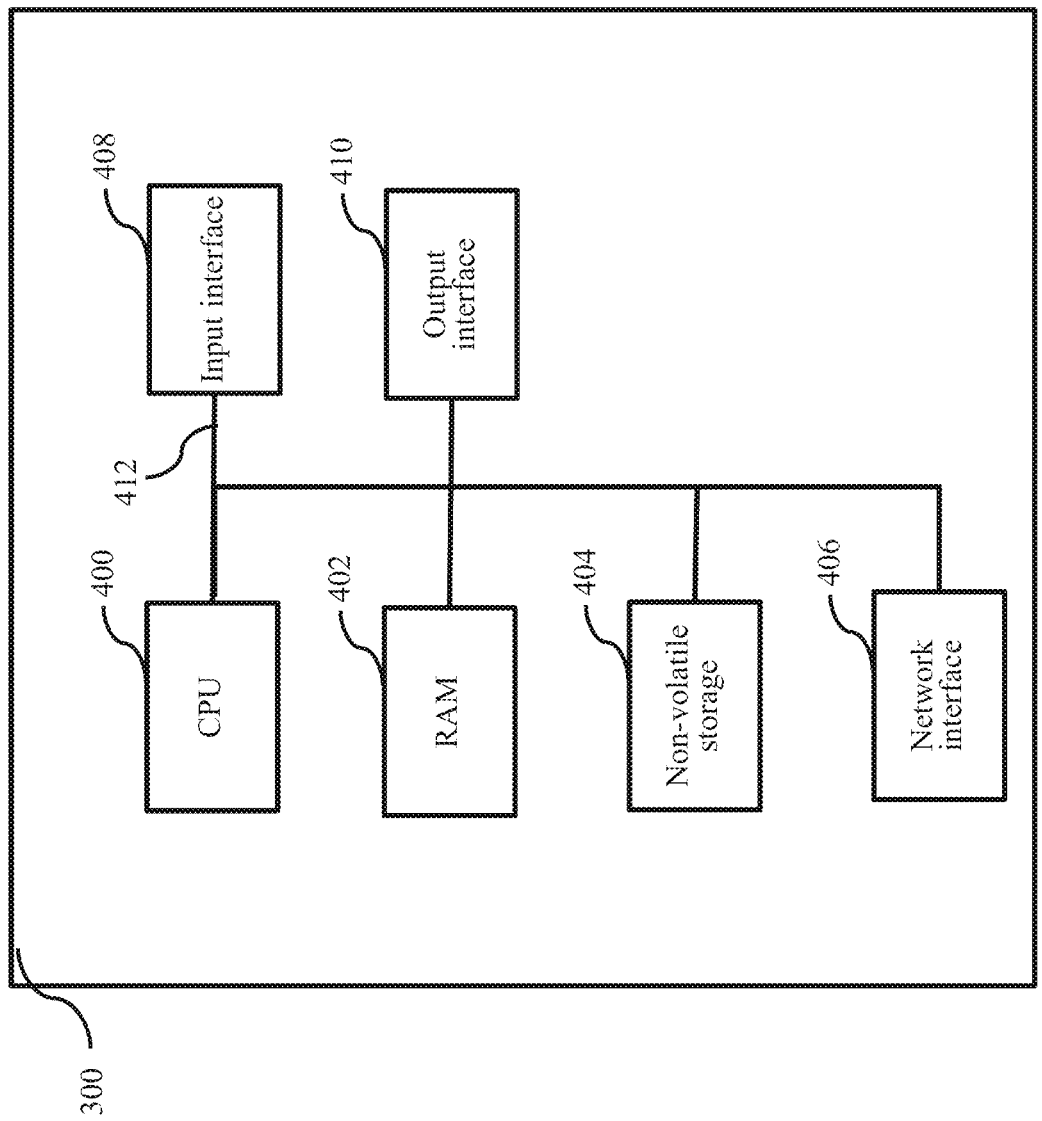
FIG. 4 shows a block diagram of the computing module, according to some embodiments.

FIG. 4 shows a block diagram of the computing module 300, according to some embodiments. The computing module 200 can include a number of physical and logical components, including a central processing unit (CPU) 400, random access memory (RAM) 402, a non-volatile storage 404, a network interface 406, an input interface 408, an output interface 410, and a local bus 412 enabling CPU 400 to communicate with the other components. CPU 400 can include one or more processors. RAM 402 provides responsive volatile storage to CPU 400. The input interface 408 enables an administrator to provide input via, for example, a keyboard and mouse.

The output interface 410 outputs information to output devices, for example, a display. The network interface 276 permits communication with other systems or computing devices. The non-volatile storage 404 stores operating system and programs, including computer-executable instructions for implementing the OCT system 200 or analyzing data from the OCT system 200, as well as any derivative or related data. During operation of the system 200, the operating system, the programs and the data may be retrieved from the non-volatile storage 404 and placed in RAM 402 to facilitate execution.

Alignment of the Spectrometer

Some embodiments are based on recognition that the alignment of the diffraction grating 238 orientations with respect to the optical axis is critical to achieve co-linear detection of the interference pattern. To obtain better alignment, the diffraction grating 238 is mounted on a 6-axis kinematic mount. Height and spatial position of the diffraction grating 238 is adjusted using iris at back port of the kinematic mount.

Further, the angle of incidence on the diffraction grating 238 is tuned. According to an embodiment, the angle of incidence on grating can be empirically determined by maximizing peak power on the area sensor 242. In particular, once the spatial position of the kinematic mount is set, the diffraction grating 238 is adjusted to find a spot where the interference pattern has maximum intensity on the area sensor 242. Additionally, height and spatial position of the area sensor 242 with respect to the diffraction grating 238 are tuned. In an embodiment, the height of the area sensor 242 is adjusted to the center of the diffraction grating 238 with respect to the area sensor 242 center using aperture in front of the area sensor 242.

Wavenumber Calibration

As the spectrometer 236 samples the light linearly in wavelength domain, non-linear sampling of k-space significantly deteriorate axial point spread function (PSF) of the OCT system 200 particularly at longer distances, broadening the axial response at longer distances. Some embodiments are based on recognition that, to mitigate such a problem, the OCT system 200 can be calibrated with a known narrow line sources or calibrate against different instruments such as optical spectrum analyzer. However, such calibrations require either well-developed light sources at a particular wavelength band of interest or expensive instruments. Some embodiments are based on recognition that, to solve the problem due to non-linear sampling of k-space, a SD-OCT calibration method can be built upon a Hilbert transform based calibration technique. The SD-OCT calibration method relies on measurement of linear phase accumulation with respect to axial position z.

The OCT system 200 captures a coherence sum of a reflected field $E_r$ and a signal field $E_s$. An intensity signal captured at the area sensor 242 for a given frequency can be expressed as follows:

$$I_d(z) = E_r^2 + E_s^2 + 2E_r E_s \cos(kz) \quad (1)$$

where k is illumination wavelength and z is the sample's axial position with respect the reference arm. The first two terms constitute DC intensity contributions from the reference and signal, respectively. The axial information from the intensity signal is encoded into a modulation frequency of an interferometric term. After filtering out the DC part, the intensity signal of interest for axial response calculations becomes:

$$I_m(z) = 2E_r E_s \cos(kz) \quad (2)$$

It is can be noted from the equation (2) that linear wavelength sampling leads to the non-linear k-space sampling.

To linearize recorded spectrograms in k-space, two image set $z_1$-$z_2$=$\Delta z$ apart from each other are obtained. The phase difference between two signals becomes $\phi = k\Delta z$ which is a linear function of frequency k. In theory, any linear measurement which is a function of k such that $y_n = f(k_n)$ where f is a linear function at any domain can be utilized to linearize the k-space. The phase of each image is calculated by taking Hilbert transforms followed by phase unwrapping. The phase difference between two measurements realizes a non-linear phase curve function, which is expected to be linear in an ideal case of k-space spectrometer. Further, the non-linear phase curve function is used for spectra interpolation in linear k-space representations. In some embodiments, to improve the accuracy of the interpolation, the captured spectra images or intensity signals are zero-padded in the frequency domain by taking N point inverse FFT. The zero padding increases spectra resolution. Further, a linear interpolation method is applied.

Line-Field Image Reconstruction Framework

A signal spectrum in the captured intensity signal is in the form of Eq. (1). The signal spectrum has spectral fringe pattern on top of DC spectra from the sample and reference signal. Fringe frequency is defined by optical path length difference between the sample and reference arm, as shown in Eq. (2). The captured raw images are DC filtered, and, subsequently, the k-space linearization process explained above is carried out. Such calibrated signal is in correct form for space-frequency domain analysis. The axial information of the specimen can be calculated via computationally efficient fast-Fourier transform (FFT) functions. Further, axial domain signals across the line-field light are low-pass filtered by a Gaussian smoothing kernel with a standard deviation, for example, of value three. A local maximum frequency bins along each spectrum represents axial location the corresponding point on the line-field light. A find max algorithm is applied to extract index position. The index positions are further converted into nominal axial displacement. A conversion ratio can be calculated from two measurements with known axial distance difference. In some embodiments, to increase the conversion accuracy, conversion ratios calculated from multiple measurement pairs are averaged.

Figure 5:
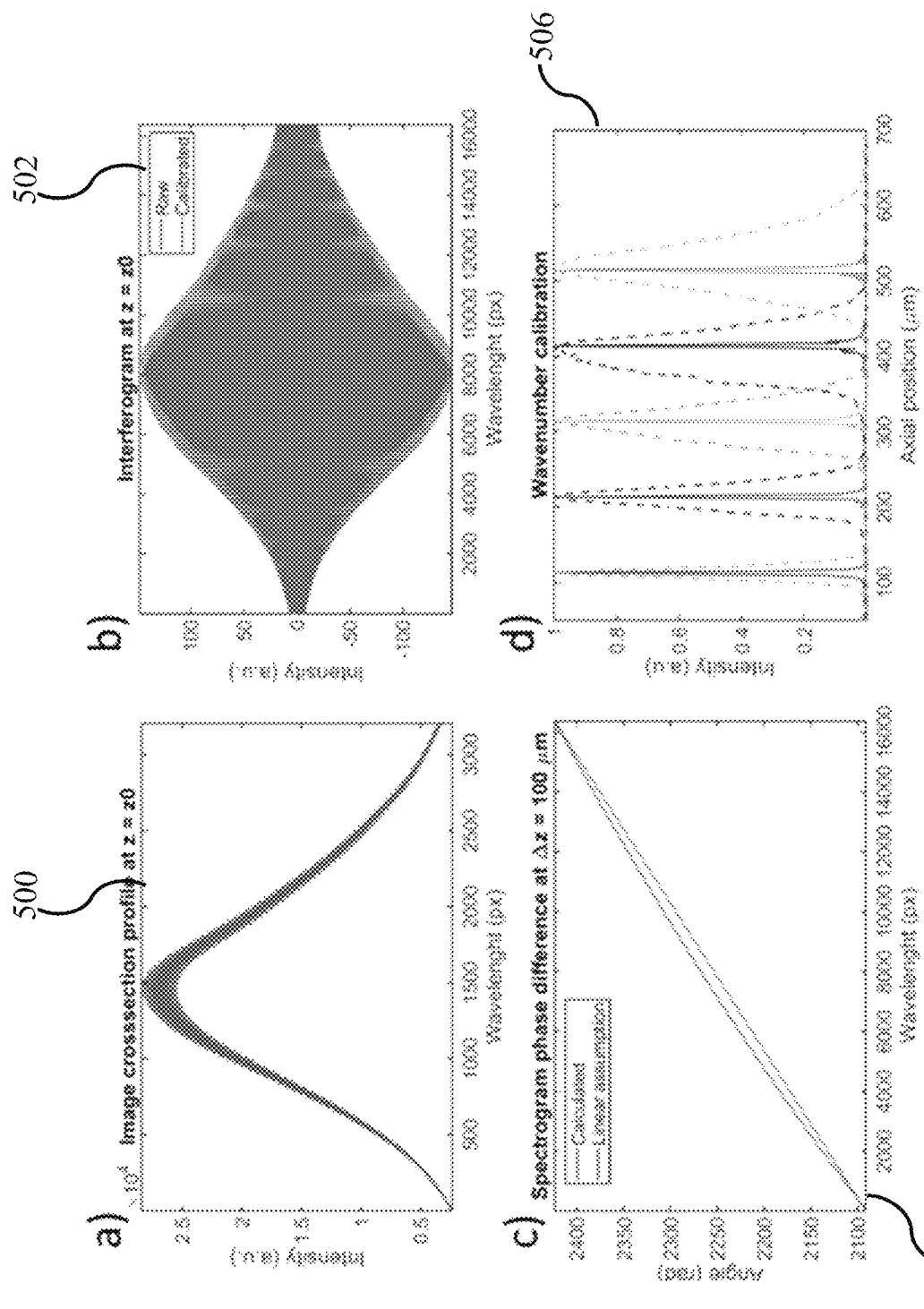
FIG. 5 illustrates wavenumber calibration process using gold mirror as sample, according to some embodiments.

FIG. 5 illustrates wavenumber calibration process using gold mirror as sample, according to some embodiments. In FIG. 5, there is shown a raw interferogram image cross-section 500 at initial position $z_0$. There is further shown a DC filtered and interpolated interferogram 502 and its wavenumber linearized interferogram. There is further shown unwrapped phase comparison 504 across zero-padded and interpolated pixel domain for $\Delta z=100$ µm. The phase curves are used for linear wavenumber sampling of raw interferogram. There is further shown axial PSF 506 at different depths. Solid and dashed lines represent calibrated and uncalibrated PSFs, respectively. PSF exhibits depth-dependent broadening behavior due to the non-linear sampling in the k-space. It can be noted that spectra sampling is increased by approximately five-fold. Further, a shift in the spectrum due to the wavenumber linearization can be observed. Moreover, the unwrapped phase difference at two measurements captured at axially displaced sample positions indicates non-linearity in k-space sampling. As shown in the representation of axial PSF 506, the axial PSFs broaden in the absence of the calibration and, therefore, drastically limit the axial resolution.

Figure 6:
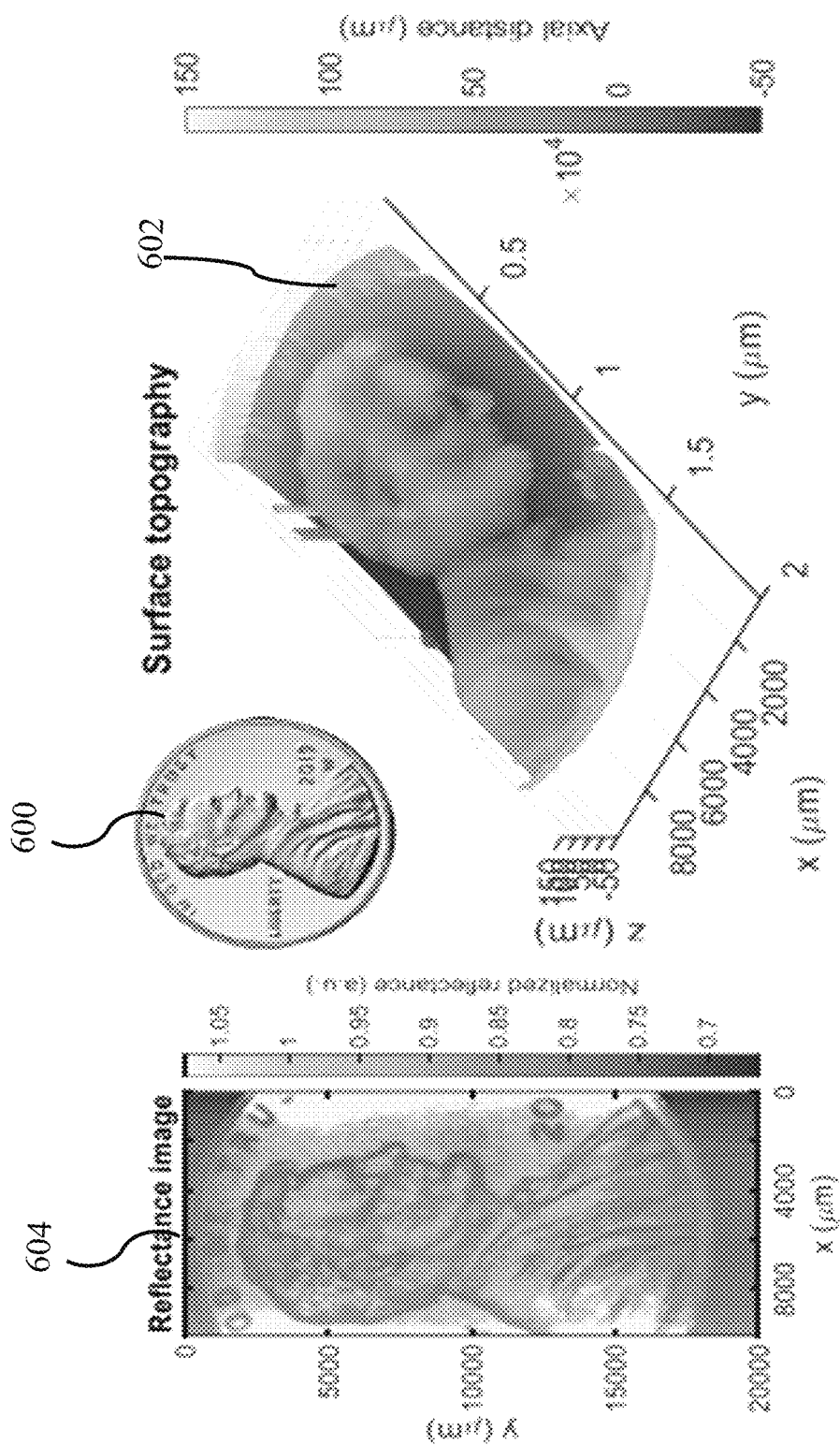
FIG. 6 illustrates profilometry measurements of a metallic surface, produced by the OCT system, according to some embodiments.

FIG. 6 illustrates profilometry measurements of a metallic surface, produced by the OCT system 200, according to some embodiments. A coin 600 including Lincoln embossment is used as a specimen. In accordance with some embodiments, the OCT system 200 is used to produce the profilometry measurements 602 of the coin 600. The profilometry measurements of the coin 600 may include a surface topographic map of the coin 600. Since the coin 600 consists of mostly coarse features, a median filter with a 3×20 window size is applied to remove noise artifacts due to low reflection at the structure edges.

Total depth range is approximately 200 µm. A reflectance image 604 calculated from intensity only interferograms as described above (in sections 'Wavenumber calibration' and 'Line-field image reconstruction framework') is provided. The reflectance non uniformity exists around periphery in x axis due to illumination intensity dropping towards edges along the line-field light. Although the apodization filter significantly improves the illumination uniformity, the edges still suffer due to the vignetting. According to some embodiments, such a problem can be mitigated by using larger optics (e.g., 2 in) or shorter line-field illumination.

Figure 7:
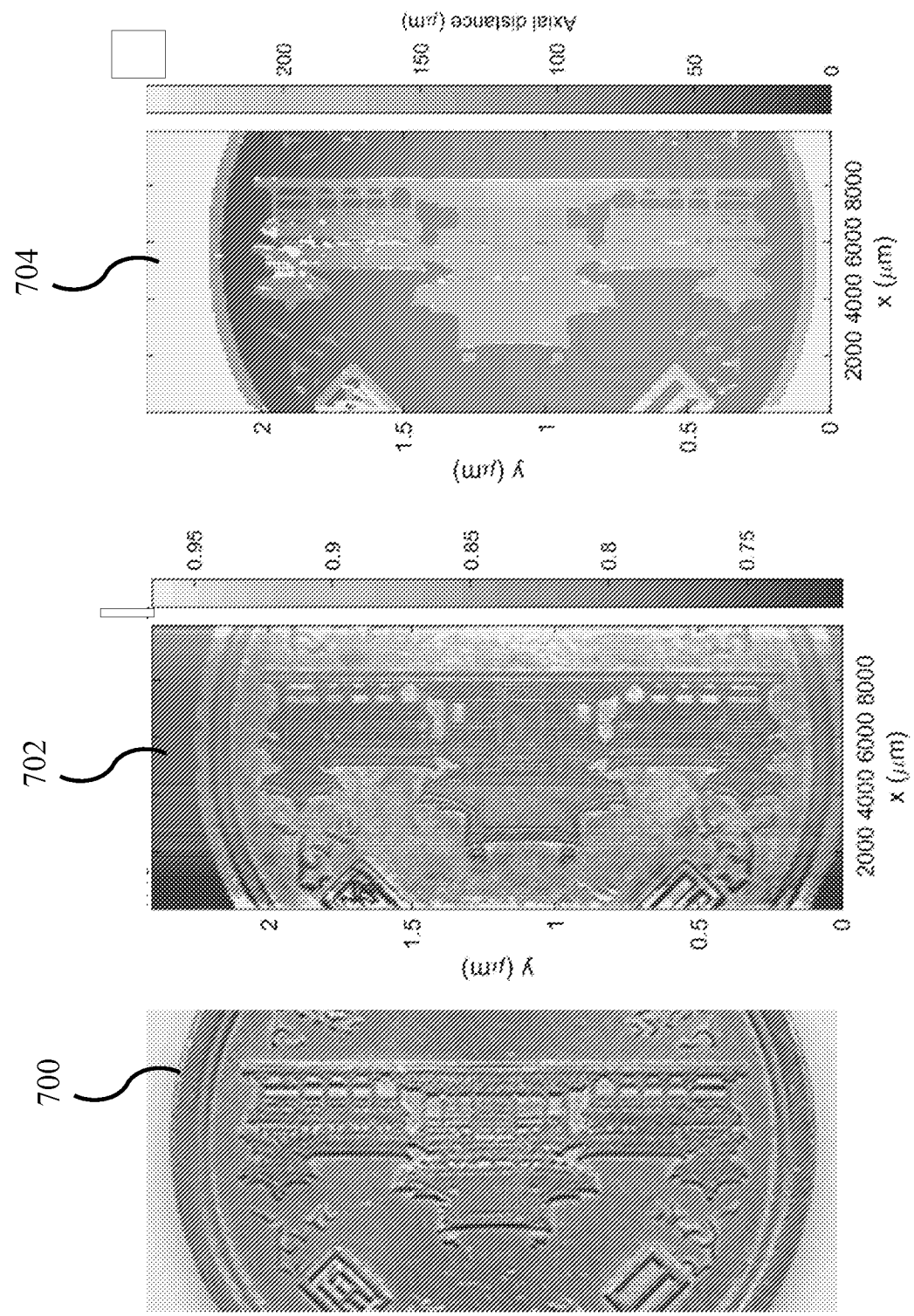
FIG. 7 illustrates profilometry measurements of a Japanese Yen coin, produced by the OCT system, according to some embodiments.

FIG. 7 illustrates profilometry measurements of a Japanese Yen coin 700, produced by the OCT system 200, according to some embodiments. The Japanese Yen coin 700 depicts a temple with sharp and dense features such as windows and pillars. 702 is a reflectance image. As seen from the reflectance image 702, low reflectivity exists at the edges. The low-reflectivity points reduce the measurement signal-to-noise (SNR) at the corresponding pixels. Therefore, depth recovery at the edges becomes more challenging. 704 shows the profilometry measurements of the Japanese Yen coin 700, produced by the OCT system 200. 704 is the surface topography of the Japanese Yen coin applied with a median filter with a 3×20 window size to remove the noise artifacts.

Figure 8:
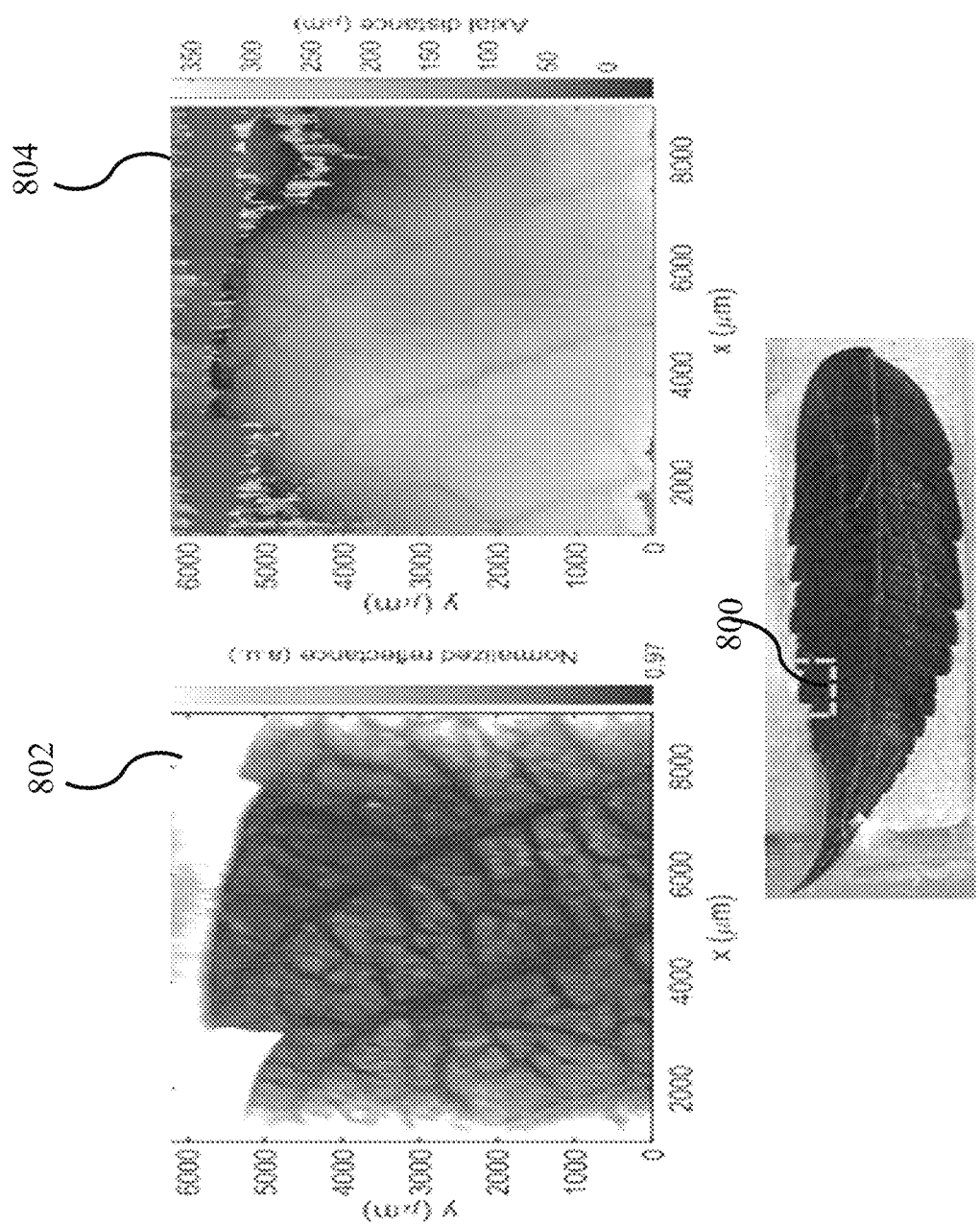
FIG. 8 illustrates profilometry measurements of a part of leaf, produced by the OCT system, according to some embodiments.

FIG. 8 illustrates profilometry measurements of a part of leaf 800, produced by the OCT system 200, according to some embodiments. In FIG. 8, there is shown a reflectance image 802 of the part of the leaf 802. There is further shown the profilometry measurements 804 (surface topography) of part of the leaf 804. The depth profile along small netted veins are consistent with the reflectance image 802. Estimated total depth range was more than 400 µm. Height increase towards the leaf center is due to elevation from thick midrib structure. It is noted that a ratio of leaf surface's reflectance to a reference mirror's reflectance is around 1-2%. The low reflectance from the leaf surface is close to detection limit of 0.7% contrast. Since the OCT system 200 relies on interferometric detection, sensitivity is limited by shot-noise. The detection limit can be further improved by using larger well-depth sensors or frame averaging.

Figure 9:
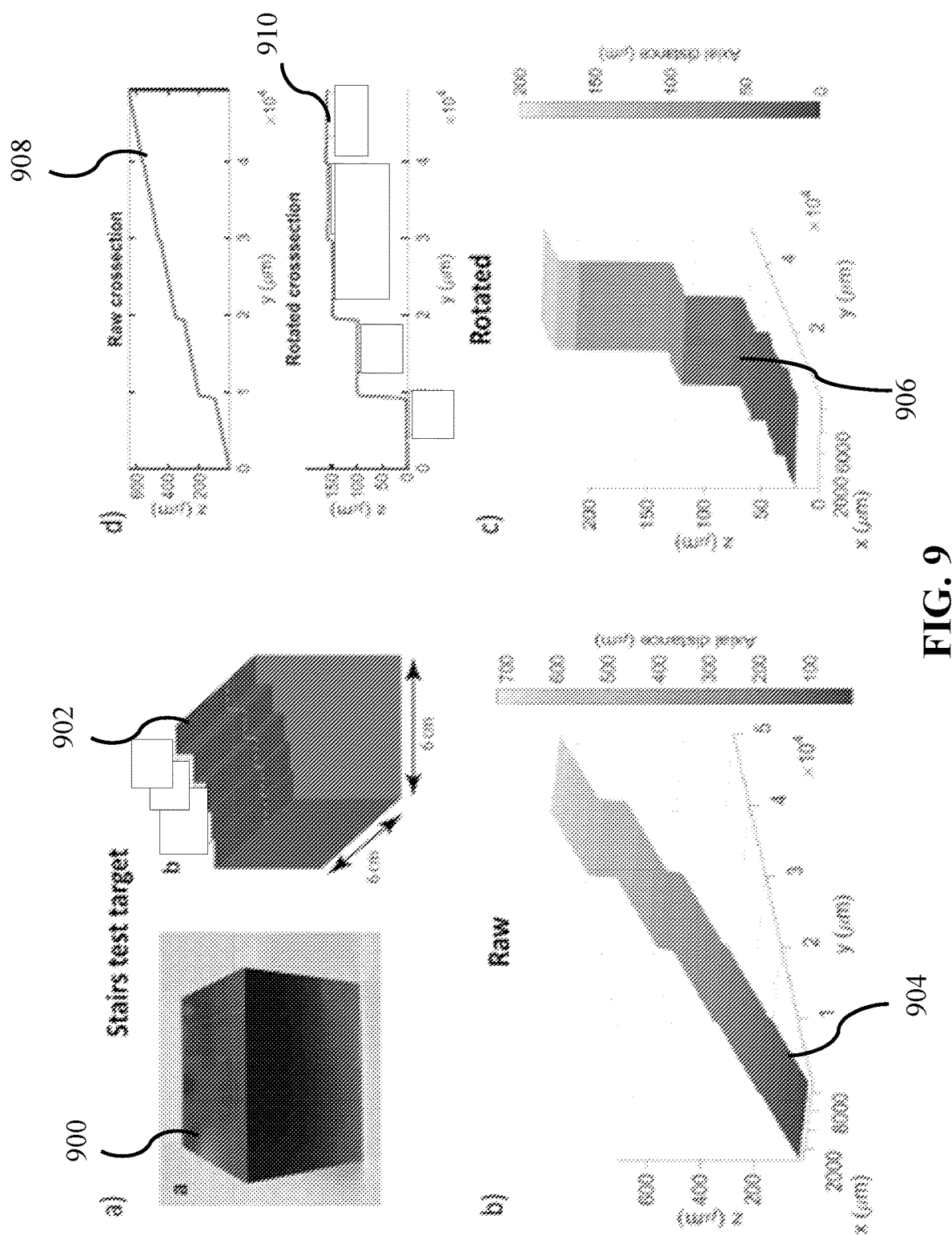
FIG. 9 shows surface topography of a test target, according to some embodiments.

FIG. 9 shows surface topography of a test target 900, according to some embodiments. In FIG. 9, there is a 3D schematic of the test target 900. There is further shown surface topography 904 of the test target 900 from raw measurements. 906 is the surface topography of the test target 900 obtained after correcting for tilt along a sample scan axis. 3D rotation matrix is applied for the correction. 908 is an averaged cross-section profile of the test target 900, from the surface topography 904. 910 an averaged cross-section profile of the test target 900, from the surface topography 906.

Figure 10:
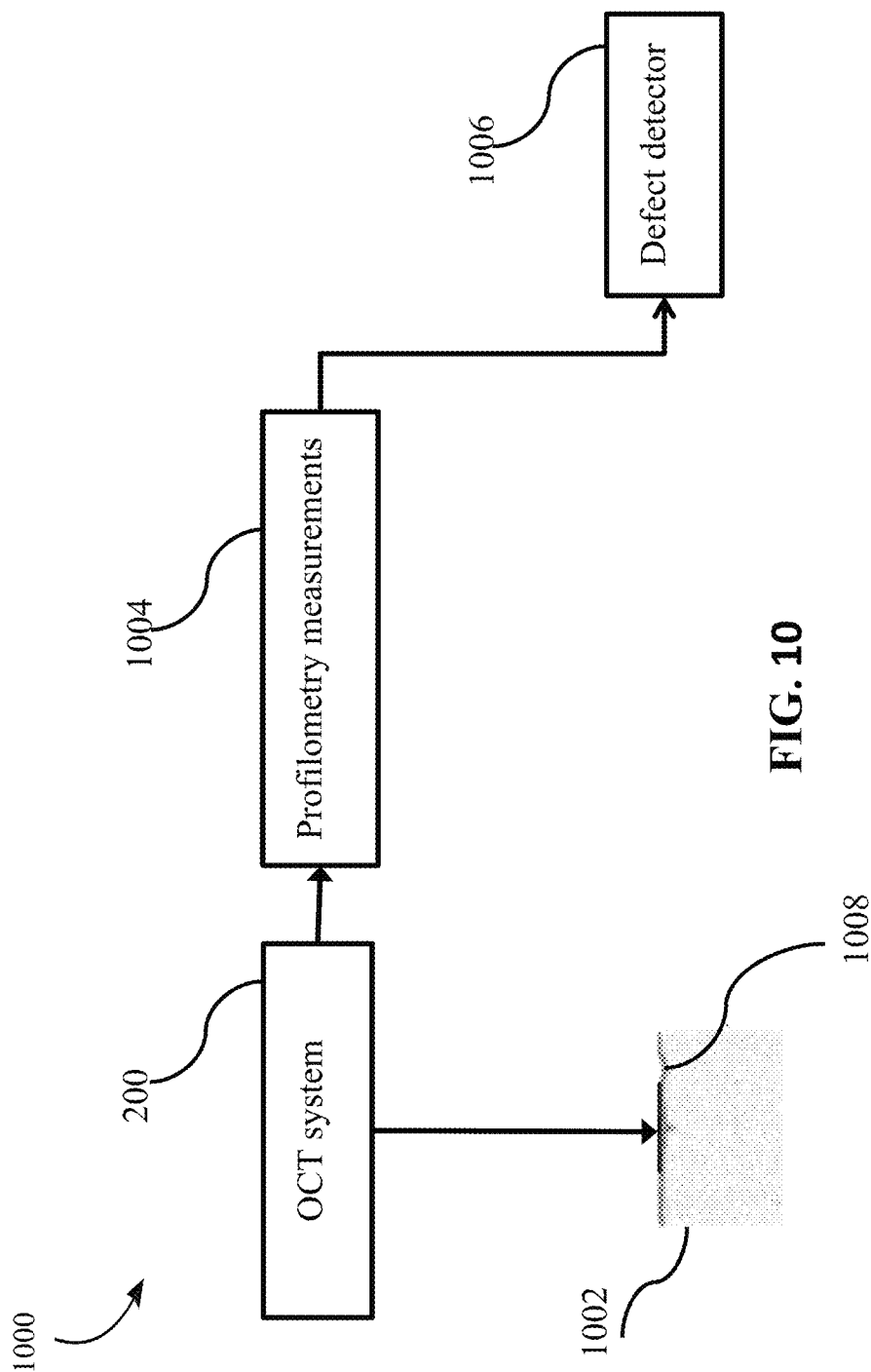
FIG. 10 shows a schematic of defect detection system using the OCT system according to some embodiments to detect defects in the specimen.

FIG. 10 shows a schematic of defect detection system 1000 using the OCT system 200 according to some embodiments to detect defects in a specimen 1002. The OCT system 200 produces profilometry measurements 1004 of the specimen 1002. The profilometry measurements 1004 are input to a defect detector 1006. The defect detector 1006 can detect whether there are defects in the specimen 1002 using image interpretation and machine learning techniques. Additionally, the defect detector 1006 may provide label 'acceptable/defective' based on the detection of defects. The label 'acceptable' indicates that no defects are detected. The label 'defective' indicates that an unacceptable defect has been detected, and in some cases, such defect is of a particular type. In an example where the specimen 1002 is a vehicle part, the defect may have different shapes and dimensions. As an example, the defect may be a dent 1008 on the vehicle part. Additionally, the defect may be an unwanted round seed or crater, or the like, on or under the surface of the specimen 1002. As an example, the acceptable/defective label may be with regards to the size, area, or volume of a defect.

In some cases, based on analysis of the profilometry measurements 1004, the OCT 200 system 100 can provide further information in form of feature localization on the specimen 1002. As an example, the information may be that there is crater at location x=3.4 cm, y=5.6 cm on the vehicle part. Such information can be particularly advantageous in certain applications. It can be advantageous for improvement to a manufacturing process by being able to detect and locate the defect in a vehicle part manufactured; for example, a particular machine in the manufacturing process could be responsible for introducing the detected defect in the manufactured vehicle part. An industrial person can note and calibrate the particular machine to avoid the defect introduction. In this regard, being able to localize the defect origin to a portion of the manufacturing process is an advantage to reduce future defects and rework.

The machine-learning techniques described herein may be implemented by providing input data to a neural network, such as a feed-forward neural network, for generating at least one output. The neural network may have a plurality of processing nodes, including a multi-variable input layer having a plurality of input nodes, at least one hidden layer of nodes, and an output layer having at least one output node.

During operation of a neural network, each of the nodes in the hidden layer applies a function and a weight to any input arriving at that node (from the input layer or from another layer of the hidden layer), and the node may provide an output to other nodes (of the hidden layer or to the output layer). The neural network may be configured to perform a regression analysis providing a continuous output, or a classification analysis to classify data. The neural networks may be trained using supervised or unsupervised learning techniques. According to a supervised learning technique, a training dataset is provided at the input layer in conjunction with a set of known output values at the output layer; for example, imaging data for which defect location and/or existence is known.

During a training stage, the neural network may process the training dataset. It is intended that the neural network learn how to provide an output for new input data by generalizing the information it learns in the training stage from the training data. Training may be affected by back-propagating error to determine weights of the nodes of the hidden layers to minimize the error. The training dataset, and the other data described herein, can be stored in a database accessible to the computing module 300. Once trained, or optionally during training, test data can be provided to the neural network to provide an output. The neural network may thus cross-correlate inputs provided to the input layer in order to provide at least one output at the output layer. The output provided by the neural network in each embodiment may be close to a desired output for a given input, such that the neural network satisfactorily processes the input data.

In some embodiments, the machine learning techniques can employ, at least in part, a long short-term memory (LSTM) machine learning approach. The LSTM neural network allows for quickly and efficiently performing group feature selections and classifications. In some embodiments, the detection can be by employing, at least in part, a convolutional neural network (CNN) machine learning approach. While certain machine-learning approaches are described, specifically LSTM and CNN, it is appreciated that, in some cases, other suitable machine learning approaches may be used where appropriate.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. An optical coherence tomography (OCT) system for profilometry measurements of a specimen with a lateral resolution across the profilometry measurements, comprising:
   a line-field generator including an extended light source of an angular size greater than the lateral resolution, a lens arranged on a path of light emitted by the extended light source for focusing the light into an extended line-field light of a width greater than the lateral resolution, and a filter arranged in a focal plane of the lens for spatially filtering the extended line-field light into a line-field light of a width equal to the lateral resolution;
   an interferometer configured to interfere the line-field light reflected from the specimen illuminated with a line-shaped focus with a reference signal of the line-field light to produce an interference pattern; and a spectrometer configured to analyze spectral components of the interference pattern in a digital domain to produce the profilometry measurements of the specimen.

2. The OCT system of claim 1, wherein a bandwidth of the light emitted by the extended light source defines an axial resolution along a height of the profilometry measurements, and wherein magnification of optics in one or combination of the interferometer and the spectrometer defines a longitudinal resolution along a length of the profilometry measurements.

3. The OCT system of claim 1, wherein the extended light source includes a light-emitting diode (LED).

4. The OCT system of claim 3, wherein the LED has 530 nm wavelength, and 35 nm bandwidth, leading to an axial resolution of 1.4 micron with a visible spectrum componentry.

5. The OCT system of claim 3, wherein the LED has with optical power of 500 mW, and wherein the spectrometer includes a complementary metal oxide semiconductor (CMOS) image sensor.

6. The OCT system of claim 1, wherein the size of the extended light source is of millimetre-scale in a range between 0.1 mm and 10 mm, while the lateral resolution is of micrometre-scale in a range between 0.1 µm and 10 µm.

7. The OCT system of claim 1, wherein the size of the extended light source is of millimetre-scale in a range between 0.1 mm and 10 mm, while the lateral resolution is of nanometre-scale in a range between 0.1 nm and 10 nm.

8. The OCT system of claim 1, wherein the lens corresponds to cylindrical lens.

9. The OCT system of claim 1, wherein the filter includes a slit having the width on the scale of the lateral resolution.

10. The OCT system of claim 9, wherein the slit reduces the width of the line-field light from millimetre range into micrometre or nanometre range.

11. The OCT system of claim 1, wherein the line-field generator includes a diffuser arranged between the extended light source and the filter and is configured to remove a chip image of the extended light source.

12. The OCT system of claim 11, wherein the extended light source includes a light-emitting diode (LED) and a collimating lens arranged between the LED and the cylindrical lens, such that the amount of optical power coupled from the LED onto the filter is maximized.

13. The OCT system of claim 1, wherein the spectrometer includes an area sensor, and a diffraction grating arranged between the interferometer and the area sensor, such that the spectral components in the interference pattern are diffracted perpendicular to the line-field light.

14. The OCT system of claim 13, wherein the area sensor includes a complementary metal oxide semiconductor (CMOS) image sensor.

15. The OCT system of claim 1, wherein the interferometer is a Michelson interferometer or a Linnik interferometer.

* * * * *